H. J. BROWN.
PLANTER.
APPLICATION FILED MAY 9, 1913.

1,084,532.

Patented Jan. 13, 1914.

2 SHEETS—SHEET 1.

Witnesses
E. R. Ruppert
Wm Baenger

Inventor
H. J. Brown
By Victor J. Evans
Attorney

COLUMBIA PLANOGRAPH CO., WASHINGTON, D. C.

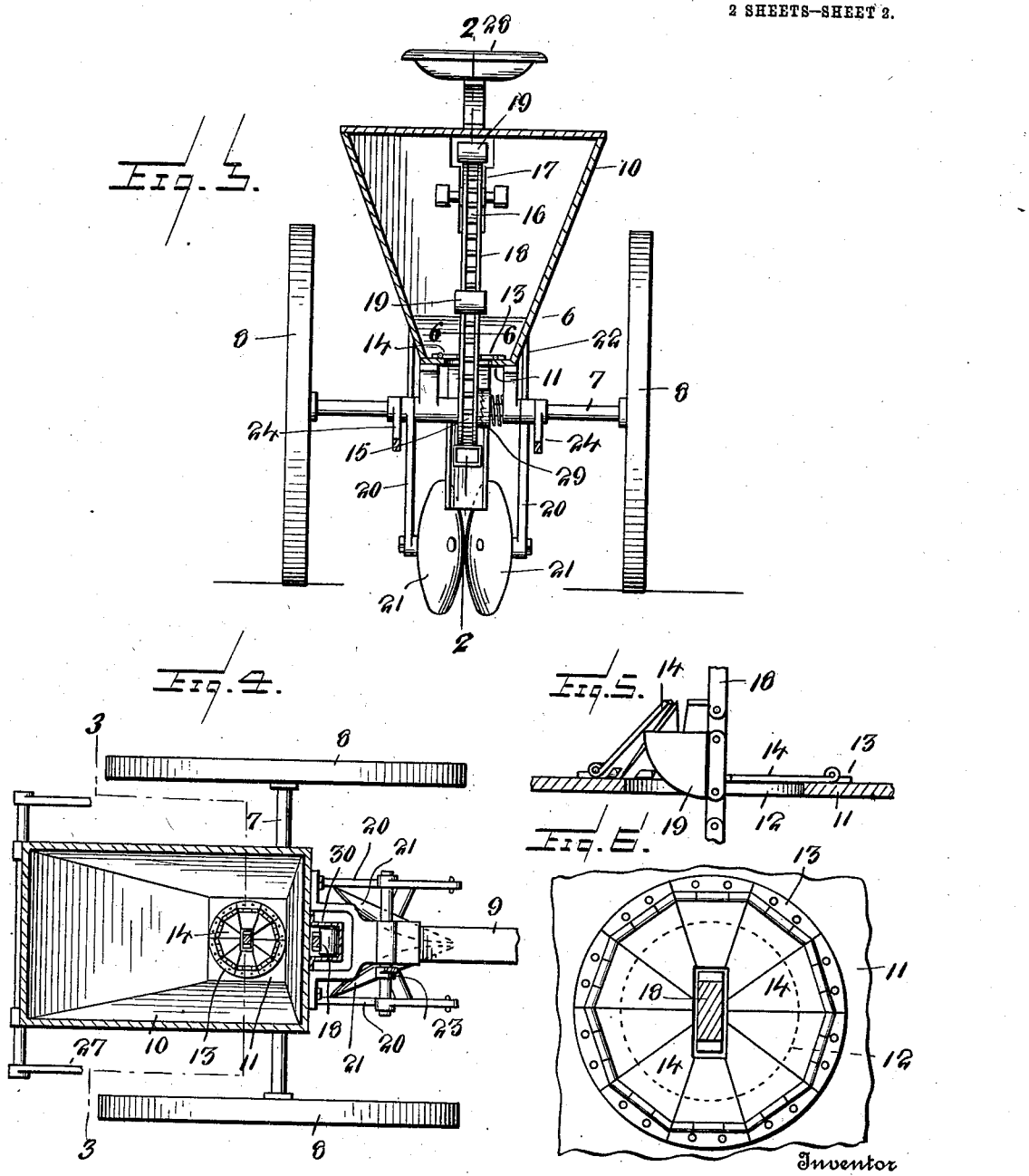

UNITED STATES PATENT OFFICE.

HARRY J. BROWN, OF MOBERLY, MISSOURI.

PLANTER.

1,084,532.   Specification of Letters Patent.   Patented Jan. 13, 1914.

Application filed May 9, 1913. Serial No. 766,553.

*To all whom it may concern:*

Be it known that I, HARRY J. BROWN, a citizen of the United States, residing at Moberly, in the county of Randolph and State of Missouri, have invented new and useful Improvements in Planters, of which the following is a specification.

This invention relates to planters and particularly to means for planting potatoes.

One object of the present invention is to produce a simple and efficient machine whereby potatoes or pieces of potatoes previously cut to a proper size will be selected, one by one, from the contents of a hopper or receptacle and be conveyed to the ground.

A further object of the invention is to produce a simple and efficient valve to coöperate with the carrier of the selecting mechanism for the purpose of obstructing the opening of the bottom of the hopper through which the carrier must pass.

A still further object of the invention is to simplify and improve the general construction of the planter.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

Figure 1:
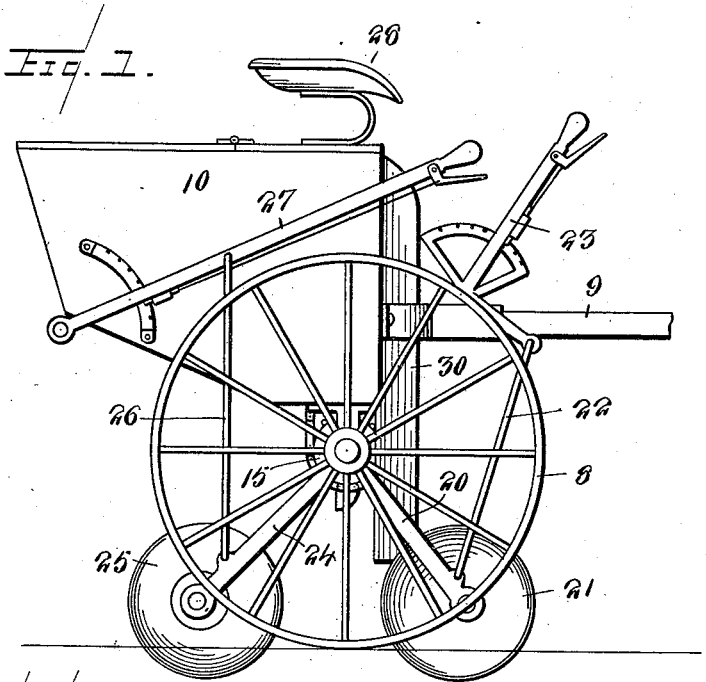
Figure 2:
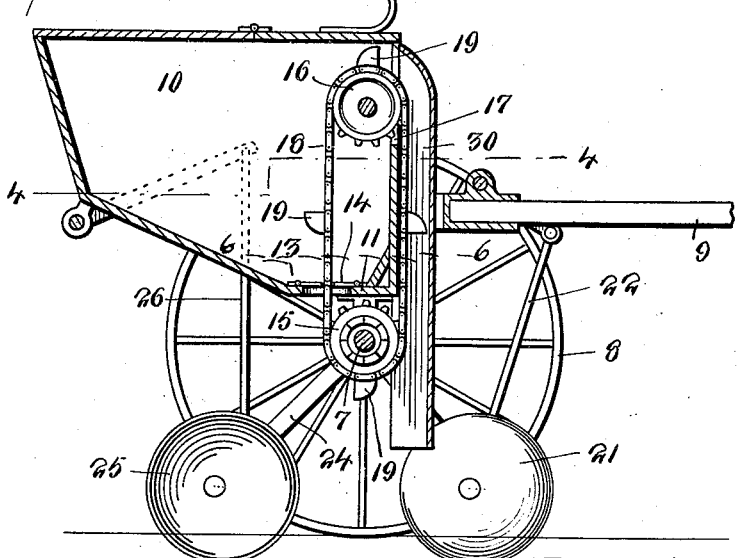

In the drawings,—Figure 1 is a side elevation of a potato planter constructed in accordance with the invention. Fig. 2 is a vertical longitudinal sectional view of the same taken on the line 2—2 in Fig. 3. Fig. 3 is a vertical transverse sectional view taken on the line 3—3 in Fig. 4. Fig. 4 is a horizontal sectional view taken on the line 4—4 in Fig. 2. Fig. 5 is a perspective detail view, showing a portion of the bottom of the hopper including the valve and a portion of the carrier chain with one of the carriers. Fig. 6 is a sectional detail view, enlarged, taken on the line 6—6 in Fig. 2.

Corresponding parts in the several figures are denoted by like characters of reference.

The frame 6 of the improved planter is mounted on an axle 7 having transporting wheels 8. Suitably connected with the frame is a tongue 9 to which draft may be applied in the customary manner.

The frame supports a hopper or receptacle 10, the bottom of which inclines downwardly and forwardly in the direction of a substantially horizontal shelf 11 having an aperture 12. Seated on the shelf 11 surrounding the aperture 12 is the valve ring 13, the internal diameter of which is larger than that of the aperture 12, said ring being provided with a plurality of radially disposed inwardly extending tongues 14 which are hingedly connected therewith and all of which terminate at a short distance from the center of the aperture. The free ends of the tongues 14 normally gravitate downwardly and are supported on that portion of the shelf 11 which is surrounded by the valve ring 13 and which is included between said valve ring and the walls of the aperture 12. It will be seen that the aperture 12 is normally nearly obstructed by the tongues 14. The axle 7 carries a sprocket wheel 15, and a similar sprocket wheel 16 is supported for rotation partly within a slot 17 in the front wall of the hopper. An endless chain 18 is guided over the sprocket wheels 15, 16, the rear lead of said chain passing through the aperture 12 between the inner extremities of the tongues 14. The chain 18 is provided with a plurality of cups or carriers 19 of sufficient size to support a single potato or a single piece of one, assuming the potatoes to have been previously divided.

Arms 20 that are pivoted upon and extend downwardly and forwardly with respect to the axle carrying furrow opening disks 21, said arms being connected by a link 22 with an adjusting lever 23. In like manner, arms 24 are pivoted on the axle from which they extend downwardly and rearwardly, said arms carrying covering disks 25 which are connected by a link 26 with an adjusting lever 27. Stop means of well known construction are provided for maintaining the levers 23 and 27, and hence the furrow openers and the covering disks at various adjustments. The adjusting levers are placed within convenient reach of the driver or operator for whom a seat 28 is provided.

The sprocket wheel 15 is preferably connected with the axle 7 by means of a spring actuated clutch 29 of well known construction, and whereby when the machine is traveling in a forward direction, the sprocket wheel and the endless chain 18 actuated thereby will be driven, while, when the machine is backed the clutch 29 will slip idly with respect to the hub of the sprocket wheel. If desired, a lever may be utilized for throwing the clutch 29, but as such an expedient is extremely common and well known, it is deemed unnecessary to illustrate the same.

It will be readily seen that when this machine is in operation, and a supply of potatoes has been placed in the hopper 10, the furrow opening disks and the covering disks will be set so as to engage the ground at the proper depth. When the machine advances the endless chain 18 will be driven and the cups 19 passing upwardly through the aperture 12 in the bottom of the hopper will lift the valve tongues 14 and pass therebetween. As each cup ascends, a potato will gravitate into the same and be seated thereon as long as a sufficient supply is maintained in the hopper. The potato will be carried upward by the cup 19 through the aperture 17 and be discharged downwardly through a spout 30, being thereby conveyed to the ground where it is dropped in the furrow and subsequently covered by the action of the covering disks. Disks are preferred for the purpose of opening the furrow and covering the seed for the reason that they are less liable to become obstructed with trash than openers and coverers of other constructions. The tongues 14 will normally obstruct the aperture 12 by gravity and prevent potatoes or pieces thereof dropping through said aperture.

Having thus described the invention, what is claimed as new, is:—

1. In a planter of the class described, a hopper having a substantially horizontal bottom shelf provided with an aperture and a bottom member inclined downwardly in the direction thereof, a valve ring seated on the shelf surrounding and spaced from the aperture, a plurality of inwardly extending radially disposed tongues hinged on the ring and supported on that portion of the shelf included between the ring and the aperture, and a carrier including an endless chain guided through the aperture and provided at intervals with cups whereby the tongues will be displaced upwardly, said tongues being reseated by gravity.

2. In a planter of the class described, an axle having supporting wheels, a frame mounted on the axle, a hopper supported on the frame and having a substantially horizontal bottom shelf provided with a circular aperture and a bottom member inclined downwardly in the direction thereof, a valve ring seated on the shelf surrounding and spaced from the aperture, tongues hinged on the ring and extending inwardly toward the center thereof, said tongues overhanging the aperture and being normally supported on that portion of the shelf which is included between the aperture and the valve ring, a sprocket wheel supported near the top of the hopper, a mating sprocket wheel supported on the axle of the machine, an endless chain guided over the sprocket wheels and through the aperture in the bottom shelf of the hopper, and conveyer cups carried by said chain.

3. In a machine of the class described, an axle having supporting wheels, a frame mounted thereon, a hopper mounted on the frame and having a valved aperture in the bottom thereof, an endless chain guided through said aperture and having conveyer cups, sprocket wheels over which the chain is guided, one of said wheels being mounted on the hopper and the other on the axle, a conveyer spout on the front of the hopper through which the chain is guided, arms pivoted on and extending forwardly from the axle, furrow opening disks carried by said arms, arms pivoted on and extending rearwardly from the axle, covering disks carried by said arms, and means for effecting vertical adjustment of the furrow openers and the covering disks and for maintaining said disks at various adjustments.

In testimony whereof I affix my signature in presence of two witnesses.

HARRY J. BROWN.

Witnesses:
  VAL. RIEGEL,
  J. S. FLEMING.

---

Copies of this patent may be obtained for five cents each, by addressing the "Commissioner of Patents, Washington, D. C."